(12) United States Patent
Geiberger et al.

(10) Patent No.: US 6,719,659 B2
(45) Date of Patent: Apr. 13, 2004

(54) CONTINUOUSLY VARIABLE VEHICLE TRANSMISSION

(75) Inventors: Axel Geiberger, Stuttgart (DE); Steffen Henzler, Bobingen/Rems (DE); Juergen Schweitzer, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/849,450

(22) Filed: May 7, 2001

(65) Prior Publication Data

US 2002/0045511 A1 Apr. 18, 2002

(30) Foreign Application Priority Data

May 5, 2000 (DE) .......................... 100 21 912

(51) Int. Cl.[7] .............................................. F16H 37/02
(52) U.S. Cl. ...................................................... 475/216
(58) Field of Search ................................ 475/207, 214, 475/215, 216, 218, 219

(56) References Cited

U.S. PATENT DOCUMENTS

| | | | | |
|---|---|---|---|---|
| 4,464,952 A | * | 8/1984 | Stubbs | 475/216 |
| 6,059,685 A | * | 5/2000 | Hoge et al. | 475/214 |
| 6,099,431 A | * | 8/2000 | Hoge et al. | 475/216 |
| 6,251,039 B1 | * | 6/2001 | Koga | 475/216 |
| 6,358,178 B1 | * | 3/2002 | Wittkopp | 475/207 |
| 6,422,966 B1 | * | 7/2002 | Haka | 475/216 |

FOREIGN PATENT DOCUMENTS

DE 19826591 A1 12/1999

* cited by examiner

*Primary Examiner*—Ankur Parekh
(74) *Attorney, Agent, or Firm*—Crowell & Moring LLP

(57) ABSTRACT

A transmission for a motor vehicle, such as a motor vehicle EVT, is configures so that the number of teeth of the first planet gear of the epicycloidal gear train, operatively connected to the output toroidal disks by the first sun gear, and of an output element of the epicycloidal gear train form a ratio not equal to one. The transmission ratio of the toroid variator can be varied in such a way, and the number of teeth of the first planet gear of the epicycloidal gear train and of an output element of the epicycloidal gear train are configured in such a way that an output shaft speed approximating zero can be selected according to the variator.

29 Claims, 15 Drawing Sheets

CONTINUOUSLY VARIABLE VEHICLE TRANSMISSION

BACKGROUND OF THE INVENTION

This application claims the priority of 198 25 591, filed May 5, 2000, the disclosure of which is expressly incorporated by reference herein.

The present invention relates to a transmission for motor vehicles, and more particularly, to a drivetrain for a motor vehicle (a) with a drive shaft and (b) an output shaft arranged coaxially with the drive shaft (c) with a continuously adjustable variator, which has two drive toroidal disks rotating together and two output toroidal disks rotating together, (d) with an epicycloidal gear train having two gears, that is at last one first sun gear and at least one planet gear supported by way of a planet carrier, (e) the drive toroidal disks or the output toroidal disks being torsionally fixed or connectable to the first sun gear of the epicycloidal gear train, and the disks (output toroidal disks; drive toroidal disks) that are not or cannot be connected to the first sun gear being torsionally fixed or connected by way of at least one planet carrier of the epicycloidal gear train.

DE 198 26 591 A1 discloses a transmission having an output shaft arranged coaxially with a drive shaft. A continuously variable adjustment of the transmission ratio is achieved by a toroid variator with two jointly rotating drive toroidal disks and output toroidal disks. The drive toroidal disks are arranged between the output toroidal disks. For further influencing the transmission ratio, the transmission has an epicycloidal gear train with a sun gear that rotates with the drive toroidal disks and a planet carrier that rotates with the output toroidal disks. The toroid variator is used for a forward gear, while a fixed transmission ratio is achieved for reverse gear. For achieving forward movement of the motor vehicle, the transmission has a starting element with hydrodynamic torque converter and lockup clutch.

SUMMARY OF THE INVENTION

An object of the present invention is to widen or improve the range of applications or functionality of a continuously variable transmission of compact construction.

According to the present invention, this object has been achieved by providing that a second planet gear moved by or with the first planet gear has a diameter such that for a transmission ratio of the variator at on operating point thereof the contact point of the second planet gear with an output element of the epicycloidal gear corresponds to the instantaneous centre of the second planet gear.

A second planet gear moved by or with the first planet gear has a diameter such that for a transmission ratio of the toroid variator at an operating point of the latter the contact point of the second planet gear with an output element of the epicycloidal gear train corresponds to the instantaneous centre of the second planet gear.

The toroid variator is a two-chamber variator with two drive toroidal disks and two output toroidal disks. As an alternative to the toroid variator, any variator that permits a continuously variable transmission ratio and has two drive toroidal disks and two output toroidal disks may be used. The two inside disks (drive toroidal disks or output toroidal disks) may be configured as one structural unit, for example as one disk with two running surfaces remote from one another.

The drive shafts and output shafts according to the present invention may be transmission input and transmission output shafts or input shafts or output shafts of a sub-division with further primary or secondary, direct or split-torque transmission stages of the vehicle transmission.

The epicycloidal gear train according to the present invention is a planetary gear train and/or an epicycloidal gear train with single planet gears, double planet gears (hereinafter also referred to as reversing gear train) or planet gears designed as stepped planet gears with or without internal gear and with one or more sun gears. A plurality of planet gears torsionally fixed to one another or intermeshing planet gears can be arranged in one or more planes. The planet carrier can support either one or more planet gears. The planet gears may be single or multiple planet gears depending, in particular, on the torques to be transmitted or the directions of rotation obtained. Each planet gear or each sun gear or individual sun gears or planet gears can mesh with one or more further gears.

The output element is preferably formed coaxially with the X—X axis, for example as an internal gear or sun gear meshing with a (first) planet gear or a (second) planet gear moved by or with the former, to which internal gear or sun gear the rotational movement of the first planet gear is transmitted. The output element is connected directly or indirectly by way of further gear stages, transmission stages or couplings to the output shaft or gearbox output shaft.

The connections may be configured as (torsionally) fixed direct connections or as indirect connections, for example by way of further gear stages, or as detachable connections, which make a torsionally fixed connection only in specific operating conditions of the transmission. According to the present invention, the disks may be connected to one another directly or indirectly by inserting further components, especially shafts. This can be done by way of the planet carrier, for example, in which the power flow, especially for a torque transmission or transmission of axial force, passes by way of the planet carrier and any (hollow) shafts arranged on its input or output side in the direction of the power flow.

The arrangement according to the invention results in a particularly compact design. Many of the components are arranged coaxially with the X—X axis and/or rotated thereabout. Owing to the coaxial arrangement of the components, which largely prevents shear forces in the transmission, the transmission according to the invention is of small overall dimensions compared to transmissions with variators that have parallel shafts or a countershaft. This is of particular importance in the context of the limited installation space available in vehicles due to necessary ground clearance or the confined transmission tunnel.

In an arrangement according to the invention, certain positions of the toroid variator result in two different input speeds of an (epicycloidal) gear train on the output side, to which the drive speed in particular and the output speed of the variator are fed, for example different input speeds for at least one planet carrier and one sun gear. The input speeds have a different direction of rotation. The different input speeds produce different speeds acting on an epicycloidal gear train or the first planet gear thereof, and a resultant instantaneous center of the planet gear.

According to the operating point of the variator the instantaneous center migrates, especially radially to the X—X axis. An arrangement of the epicycloidal gear train through an appropriate choice of diameters and transmission ratios, so that engagement of the planet gear or a further planet gear operatively connected thereto (for one operating point of the variator) occurs at the instantaneous center of the (first or second) planet gear, results in a static output element (for this operating point). A similar configuration is possible with a different arrangement of the epicycloidal gear train, for example with double and/or stepped planet gears.

A "reversing gear train" is hereinafter taken to be a transmission stage with a reversal of the direction of rotation direction of an input speed to the output speed. For example, the reversing gear train is configured with two intermeshing planet gears arranged between sun gear and internal gear, especially with a transmission ratio of $i=-1$.

The arrangement according to the present invention means therefore that for one variator position the speed of the output shaft is zero, which can be used when the driver requires the vehicle in the stationary position. Slight variations of the operating point of the variator produce large reductions in the drive speed, which results in high starting torques.

With the configuration according to the invention, a starting element such as, for example, a hydrodynamic torque converter and any additional torque converter lockup clutch can be dispensed with. This results in a short overall axial length, a small design volume, a low weight of the transmission according to the invention and fewer components. There are no torque converter losses.

In the known prior art engine shaft and propeller shaft have different directions of rotation in forward drive, which necessitates an additional transmission stage for reversing the rotation direction. This leads to problems with installation in series production cars. For example, it is not possible to resort to existing rear-axle transmissions.

With appropriate selection of the geometric/kinematic parameters of the epicycloidal gear train, the present invention makes it possible, according to the position of the variator, to obtain operation of the transmission at inverse output speeds for the same drive direction. Thus eliminates the need for an additional transmission stage to permit a selectable reversal of direction. This is the case particularly where the operating point of the variator for a stationary output shaft does not form the boundary of the variator operating range. Known transmissions need two separate gears for forward and reverse gear, and at least one further shift element. With the arrangement according to the invention, these components can be eliminated.

The transmission in a currently preferred embodiment has two disks of the variator rotating with one another. That is, the drive toroidal disks or output toroidal disks are connected to one another by the planet carrier of the epicycloidal gear train. The planet carrier therefore has a multifunctional use to simplify the overall construction. If the drive and/or output toroidal disks are separately supported, the bearings must absorb axial forces owing to the contact pressure forces acting between the drive and output toroidal disks and necessary for the transmission of force. This is not necessary with the connection by way of a planet carrier according to the invention. For example, the inner disks rigidly connected together and the transmission elements between the disks, such as toroidal disks or (intermediate) rollers, are arranged between the outer disks rigidly connected together, and are braced with one another owing to the axial dimensioning of the connections. The disks with the assigned connecting elements therefore form a self-contained system with forces cancelling one another out.

The bearing can thereby be configured to save overall space, in particular as a purely radial bearing. A further advantage is an improvement in efficiency. Alternatively, or in addition, elements, especially spring or adjusting elements (for example, mechanical, hydraulic or servo elements) for adjusting the tensioning or the axial distance can be used to obtain the necessary pretensioning force.

The outer disks are preferably connected to one another by the planet carrier and any further hollow shafts. A further simplification or reduction in the size of the construction can thereby be achieved. There is no need for coupling of the inner disks by a connecting element carried radially outside the X—X axis over the inner disks, for example a dished body having a large geometric moment of inertia owing to the large radial distance. Any support for the rollers in relation to the casing, which owing to the dished body has to be led into the other chamber by way of a hollow shaft arranged between the inner shaft and the inner disks, can also be eliminated.

The connection or the power flow passes, for example, from a first outer disk by way of a hollow transmission shaft running radially inside the inner disks, to an outer hollow transmission shaft or drive shaft. Inner and outer transmission shafts are connected, and in particular torsionally fixed to one another, by a planet carrier supporting the planet gear(s), at the same time absorbing at least the axial forces and forces in the circumferential direction of the X—X axis, for example.

According to a special embodiment of the invention, the rotational movement of the first planet gear or the output shaft is transmitted by at least one further gear to the gearbox output shaft, particularly to achieve a second drive range. The speed increase or reduction obtained by the variator and the epicycloidal gear train can hereby be varied or, in particular, the spread of the transmission adjusted. In this way transmission ranges can be obtained far beyond the limits of current range automatic transmissions. In particular higher starting ratios can be represented compared to the prior art. In addition, an overdrive can be provided to reduce the engine running speed, especially at high speeds. In particular, a sun gear or the second sun gear or an internal gear is braked in relation to the transmission case to achieve a further drive range.

The further transmission is preferably a transmission stage that can be selected by couplings or brakes. At least one further drive range can thereby be achieved through a simple and/or compact construction. In particular, the drive range can be changed at synchronous speed, thereby making possible shifting of the transmission with little, if any, interruption of the tractive force.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
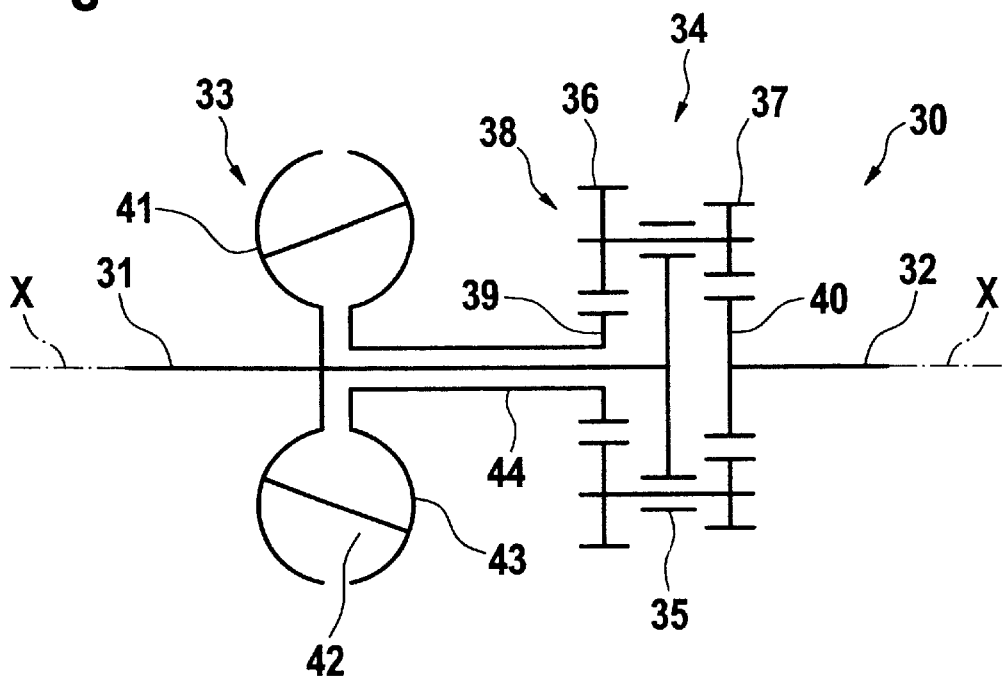
FIG. 1 is a schematic view of a transmission concept with single-chamber variator and epicycloidal gear train according to the present invention.

In the following, comparable components in the different embodiments are generally identified by the same reference numbers.

A transmission designated generally by the numeral 30 has a drive shaft 31 and an output shaft 32, which are arranged coaxially with one another along the X—X axis. The drive shaft 31 and the output shaft 32 are connected to one another by a variator 33, in particular a single-chamber toroid variator, and an epicycloidal gear train 34. As an alternative to the embodiment shown in FIGS. 1 to 3, the variator 33 may also be a two-chamber toroid variator (FIGS. 4 to 24).

According to FIG. 1 the epicycloidal gear train 34 has a planet carrier 35, a first planet gear 36 and a second planet gear 37, all of which are integrated into a stepped planet gear 38, and a first sun gear 39 meshing with the first planet gear 36 together with a second sun gear 40 meshing with the second planet gear 37. The planet gears 36, 37 and/or the stepped planet gear 38 are pivoted in relation to the planet carrier 35 so that they can turn about an axis parallel to the X—X axis.

In the transmission 30, the drive power, at least in one drive range, is split by a first torque divider and a second torque divider. In the first torque divider the power is transmitted by a drive tordoidal disk 41 torsionally fixed to the drive shaft 31, intermediate roller 42 and the output toroidal disk 43 of the variator 33, to a first transmission shaft 44, arranged coaxially with the X—X axis, which shaft in one end area is torsionally fixed to the output toroidal disk 43 and at the opposite end area to the first sun gear 39. Power in the second torque divider is transmitted by the planet carrier 35 of the epicycloidal gear train 34 torsionally fixed to the drive shaft 31 in an end area of the latter.

The second planet gear 37 of the stepped planet gear 38 meshes with a second sun gear 40, fixed to the output shaft 32 and rotating about the X—X axis. The planet gears 36, 37 (and the assigned sun gears 39, 40) have different numbers of teeth and different diameters. In particular, the first planet gear 36 has a larger diameter than the second planet gear 37.

The first planet gear 36 and first sun gear 39, as well as the second planet gear 37 and second sun gear 40 mesh in two successive parallel planes in the direction of the X—X axis. The planet gears 36, 37, in different planes in their circumferential direction, are operatively connected solely to the sun gears 39, 40 and mesh with the latter. An internal gear is not provided. The movement of the planet gears 36, 37 is determined by the sun gear 39 and the planet carrier 35.

Figure 2:
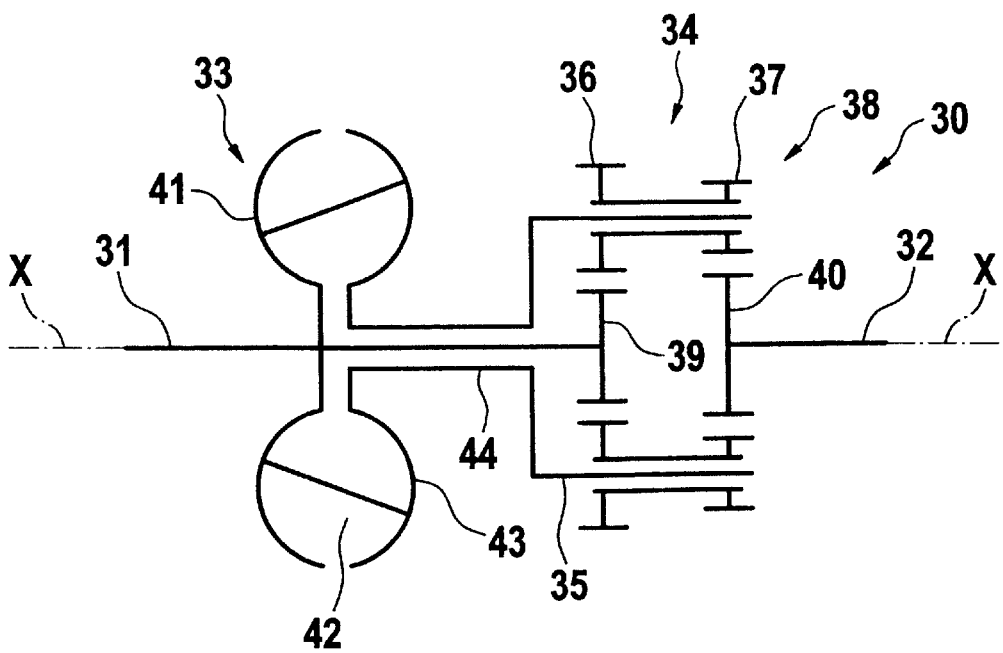
FIG. 2 is a schematic view of a further transmission embodiment with single-chamber variator and epicycloidal gear train.

Departing from the example of an embodiment according to FIG. 1, the first transmission shaft 44 according to the example of an embodiment represented in FIG. 2 is torsionally fixed to the planet carrier 35, so that the components rotate with one another, and the drive shaft 31 is torsionally fixed to the second sun gear 39.

According to a further embodiment (FIG. 3), the epicycloidal gear train 34 is a planetary transmission with internal gear 45 and a planetary gear train 46 formed with radially arranged and intermeshing planet gears 47, 48. The planetary gear train 46 has a first planet gear 47 and a second planet gear 48 which intermesh in an area facing one another. The second planet gear 48 in the area situated radially outside the X—X axis meshes with the internal gear 45 torsionally fixed to the output shaft 32, while the first planet gear 47 in the area situated radially inside the X—X axis meshes with the first sun gear 39. Both planet gears 47, 48 are pivoted in relation to the planet carriers 49, 50. The planet carriers 49, 50 are torsionally fixed to one another and rotate together or form a common planet carrier.

In its end area opposite the variator 33, the first transmission shaft 44 torsionally fixed to the output toroidal disk 43 carries the first sun gear 39. The planet carriers 49, 50, supporting the planet gears 47, 48 of the reversing gear train, are torsionally fixed to the drive shaft 31.

Figure 3:
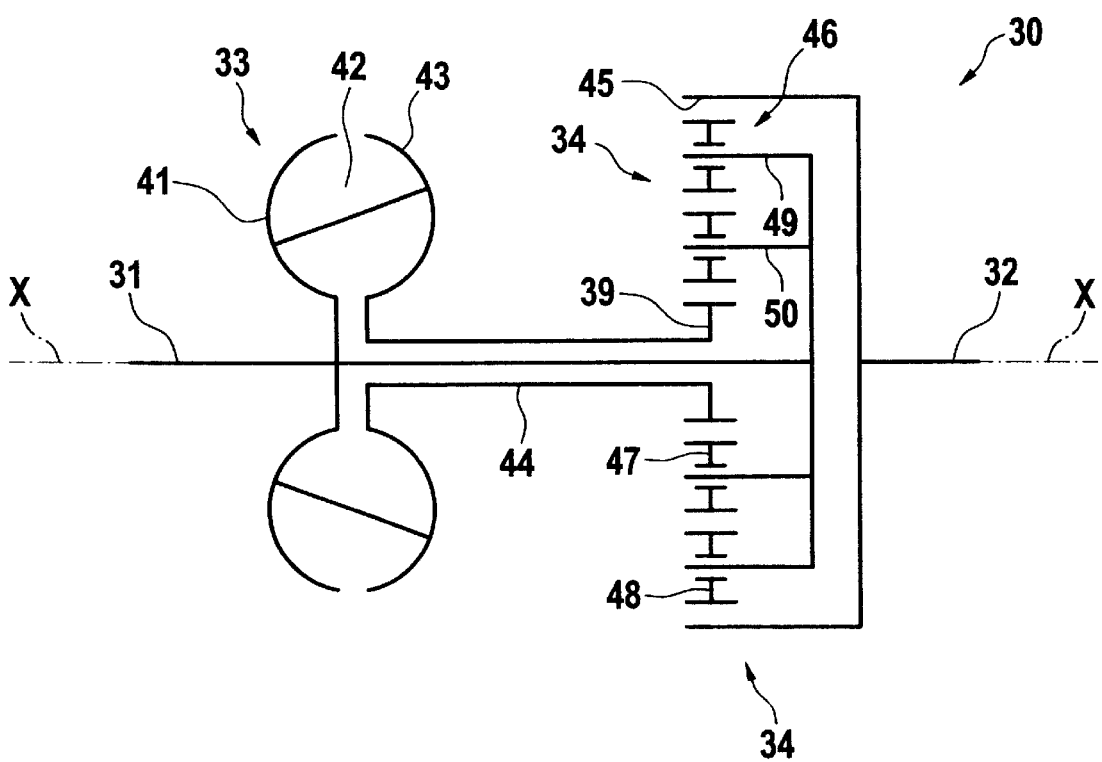
FIG. 3 is a schematic view of a further transmission embodiment with single-chamber variator and planetary gear train.
Figure 4:
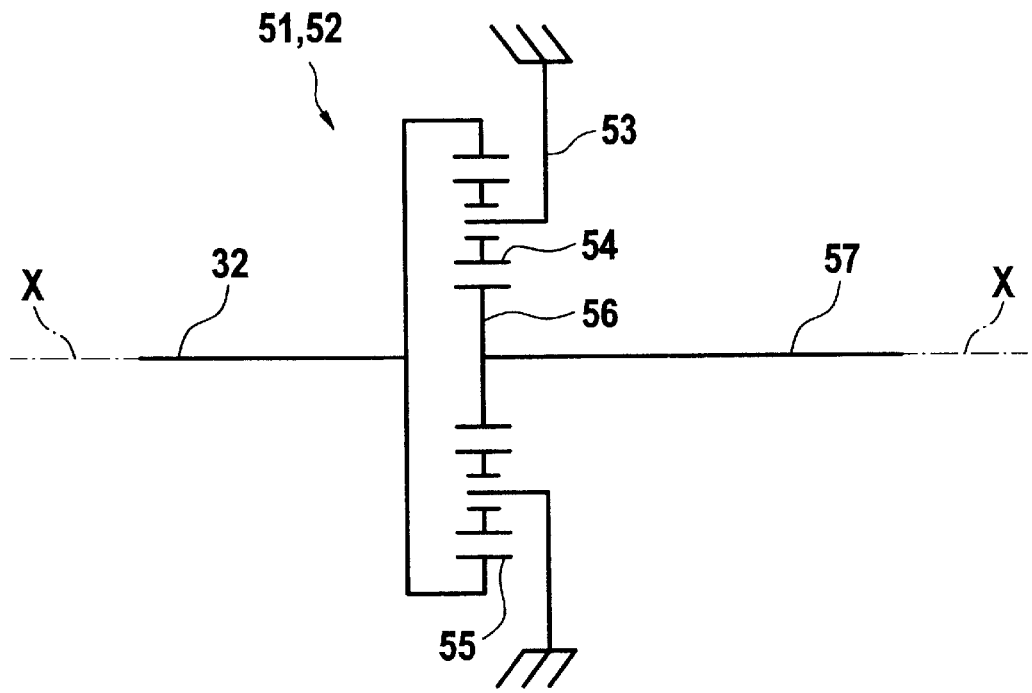
FIG. 4 is a schematic view of an ordinary gear train for a further transmission stage, FIG. 5. is a schematic view of another ordinary gear train for a further transmission stage, FIG. 6. is a schematic view of shows another ordinary gear train for a further transmission stage.
Figure 5:
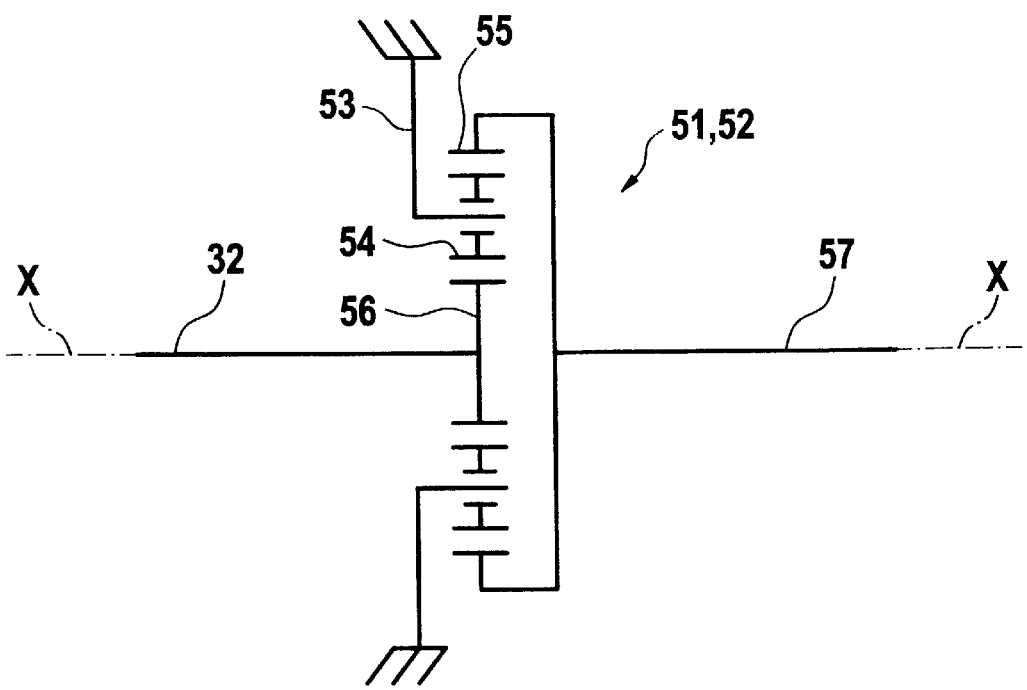
Figure 6:
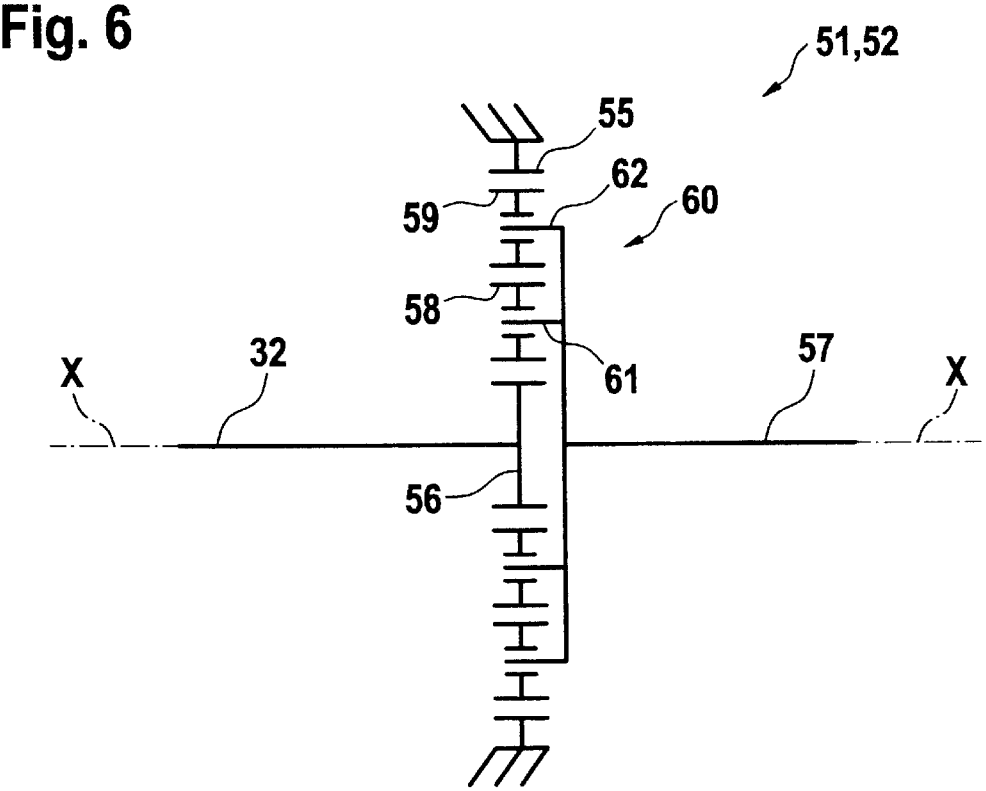

The further transmission stages 51 represented in FIGS. 4 to 9 can be optionally combined with one of the embodiments represented in FIGS. 1 to 3. The further transmission stage 51 may be, for example, a planetary gear train 52 with a planet gear 54 pivoted in relation to planet carrier 53 fixed to the transmission case. Internal gear 55 is torsionally fixed to the output shaft 32, and gearbox output shaft 57 is torsionally fixed to a third sun gear 56 (FIG. 4). Alternatively, the third sun gear 56 is torsionally fixed to the output shaft 32, and the internal gear 55 is torsionally fixed to the gearbox output shaft 57 (FIG. 5).

According to a second embodiment of the further transmission stage 51, two planet gears 58, 59 are provided as reversing gear train 60 of a planetary gear train 52, which is essentially configured according to the description thereof with reference to FIG. 3. According to FIG. 6 the planet carriers 61, 62 supporting the planet gears 58, 59 are torsionally fixed to the gearbox output shaft 57, the internal gear 55 is fixed to the casing and the third sun gear 56 is torsionally fixed to the output shaft 32. The planet carriers 61, 62 are (torsionally) fixed to one another, rotate together or form a common planet carrier.

Figure 7:
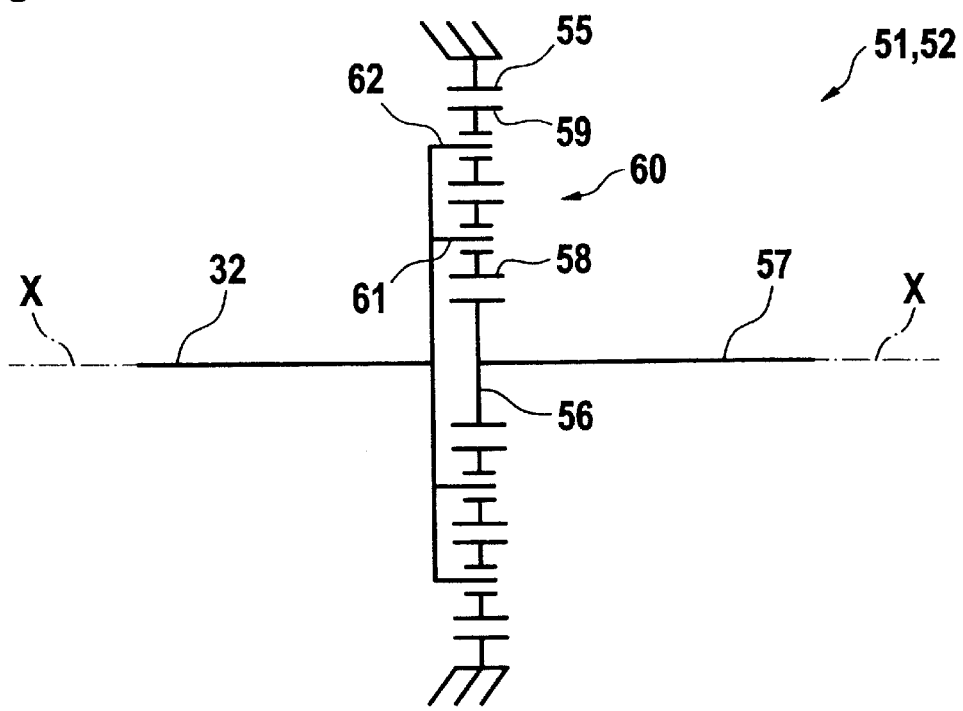
FIG. 7 is a schematic view of yet another ordinary gear train for a further transmission stage.

According to FIG. 7 the planet carriers 61, 62 are supported torsionally fixed in relation to the output shaft 32, and the third sun gear 56 is similarly supported in relation to the gearbox output shaft 57.

Figure 8:
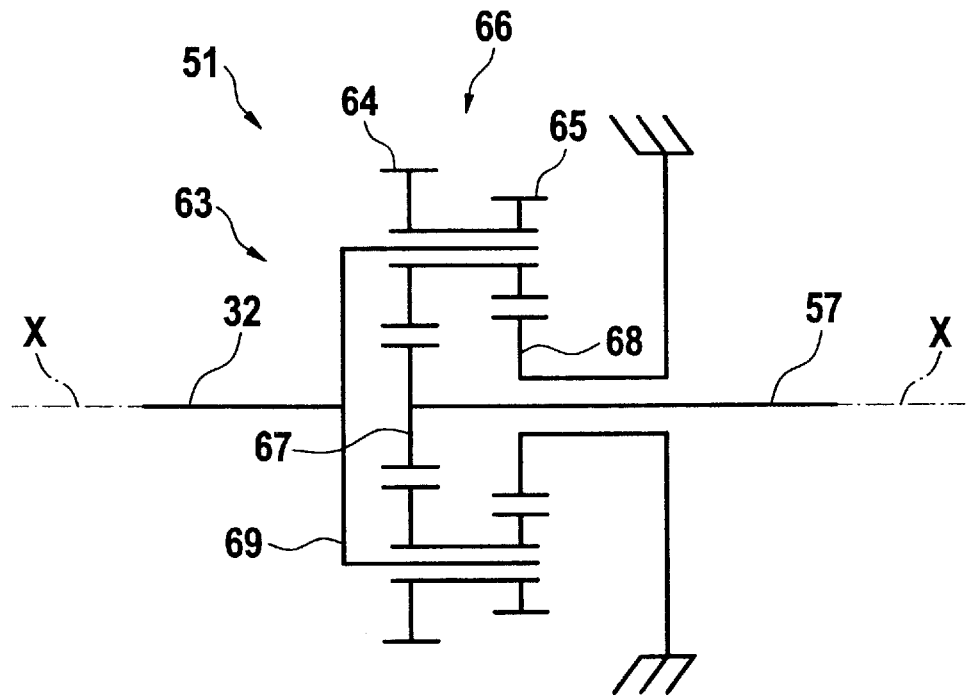
FIG. 8 is a schematic view of a still further ordinary gear train for a further transmission stage.
Figure 9:
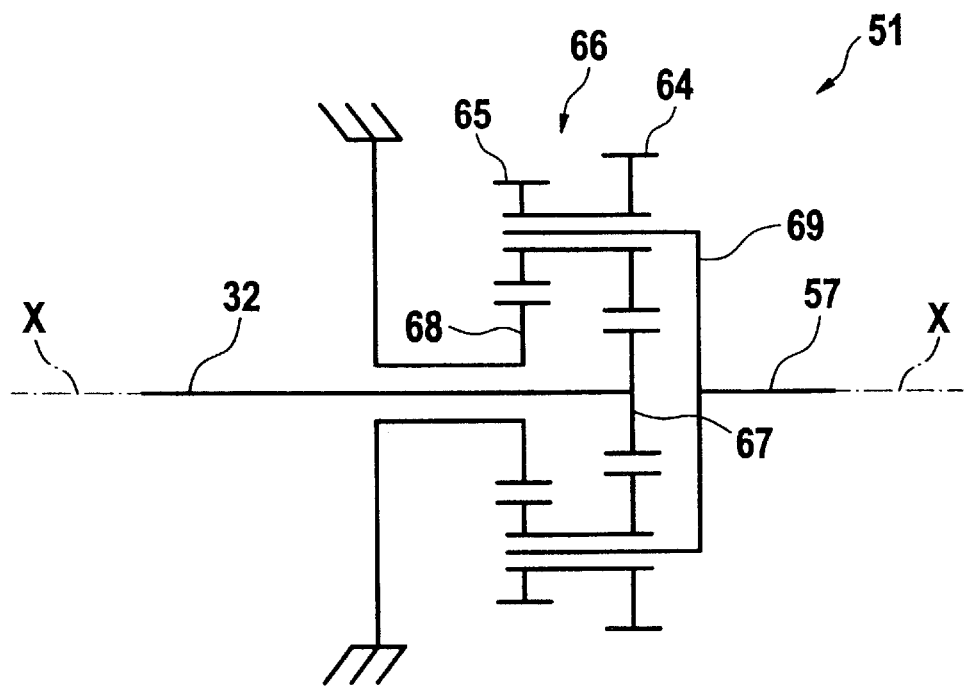
FIG. 9 is a schematic view of another ordinary gear train for a further transmission stage.

According to the embodiments in FIGS. 8 and 9, the further transmission stage 51 is an epicycloidal gear train 63 with a stepped planet gear 66 having two planet gears 64, 65, two sun gears 67, 68 and a planet carrier 69.

According to FIG. 8 the output shaft 32 is torsionally fixed to the planet carrier 69. The stepped planet gear 66 meshes with the third sun gear 67 connected to the gearbox output shaft 57 and also with the fourth sun gear 68 fixed to the casing. The sun gear 68 has a larger diameter than the third sun gear 67.

In the embodiment according to FIG. 9, the output shaft 32 is connected to the third sun gear 67 which meshes with the stepped planet gear 66. The stepped planet gear 66 also rolls on the fourth sun gear 68 fixed to the casing. The sun gear 68 has a larger diameter than the third sun gear 67. The planet carrier 69 is torsionally fixed to the gearbox output shaft 57.

FIGS. 10 to 14 show further developments of the transmission according to the invention, in particular combining the concepts according to FIGS. 1 to 3 with concepts for the further transmission stage according to FIGS. 4 to 9.

Figure 10:
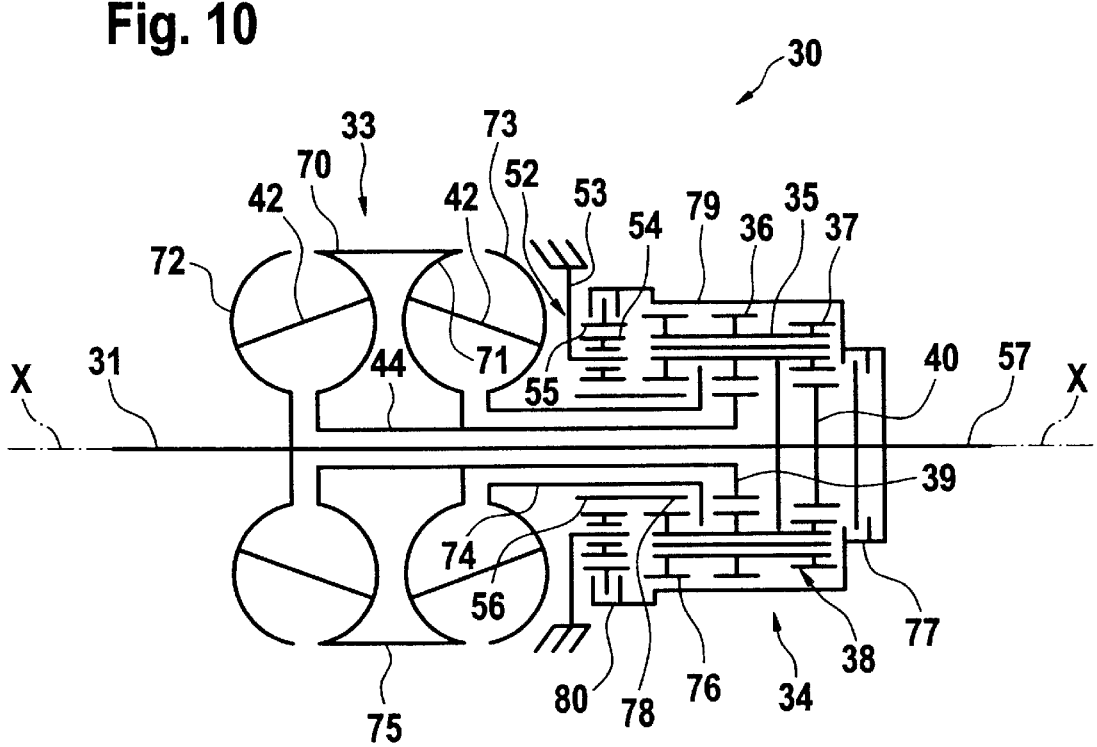
FIG. 10 is a schematic view of an example according to the invention of a first variant of a transmission.

FIG. 10 is a combination of the developments represented in FIG. 1 and FIG. 5. According to FIG. 10, two output toroidal disks 70, 71 of a two-chamber variator 33, which are arranged between the drive toroidal disks 72, 73, are connected to one another by a first transmission shaft 44 or are integrally formed or are formed as one unit. Alternatively or in addition, the output toroidal disks 70, 71 are connected to one another by a radially external connection 75. An extension of the first transmission shaft 44 from the variator 33 into the epicycloidal gear train 34 carries the first sun gear 39.

The two drive toroidal disks 72, 73 are connected by the torsionally fixed connection of the first drive toroidal disk 72, arranged on the input side, to the drive shaft 31, by way of that part of the drive shaft 31 arranged between drive toroidal disk 72 and the planet carrier 35, and by way of the planet carrier 35 and a second transmission shaft 74 torsionally fixed to the planet carrier 35 in one end area and to the second drive toroidal disk 73 in the other end area. The transmission shafts 44, 74 and the drive shaft 31 are arranged coaxially with one another, with the transmission shaft 74 being arranged outside the transmission shaft 44 and enclosing the latter in a circumferential direction.

The stepped planet gear 38 pivoted in relation to the planet carrier 35 is provided with a first planet gear 36, a second planet gear 37 and a further planet gear 76. The first planet gear 36 meshes with the first sun gear 39. The second planet gear 37, arranged on that side of the first planet gear 36 remote from the variator 33, engages with an output element, which is designed as second sun gear 40 and is connected by way of a first coupling 77 to the gearbox output shaft 57. The further planet gear 76, preferably provided with an identical or similar number of teeth to the first planet gear 36 engages with a further sun gear 78, torsionally fixed to the third sun gear 56. The sun gears are arranged coaxially with the X—X axis and in particular have the same diameter. The ratio between the number of teeth on the first sun gear 39 and on the first planet gear 36 preferably corresponds to the ratio between the number of teeth on the further sun gear 78 and on the planet gear 76.

The third sun gear 56 is an integral part of the planetary gear train 52 and engages with a planet gear 54 supported in relation to a planet carrier 53 fixed to the casing. The internal gear 55 operatively connected to the planet gear 54 is assigned to a drum 79, torsionally fixed to gearbox output shaft 57, and can be connected to the drum by a second coupling 80. The coupling 80 is accommodated in the drum 79 and is braced in relation thereto. The drum 79 contains the planetary gear train 52 and the epicycloidal gear train 34. The planet carrier 35 is radially supported in relation to the first transmission shaft 44 or connected thereto between the first planet gear 36 and the further planet gear 76, for example, while it is supported in relation to the drive shaft 31 or connected thereto between the first planet gear 36 and the second planet gear 37.

Figure 11:
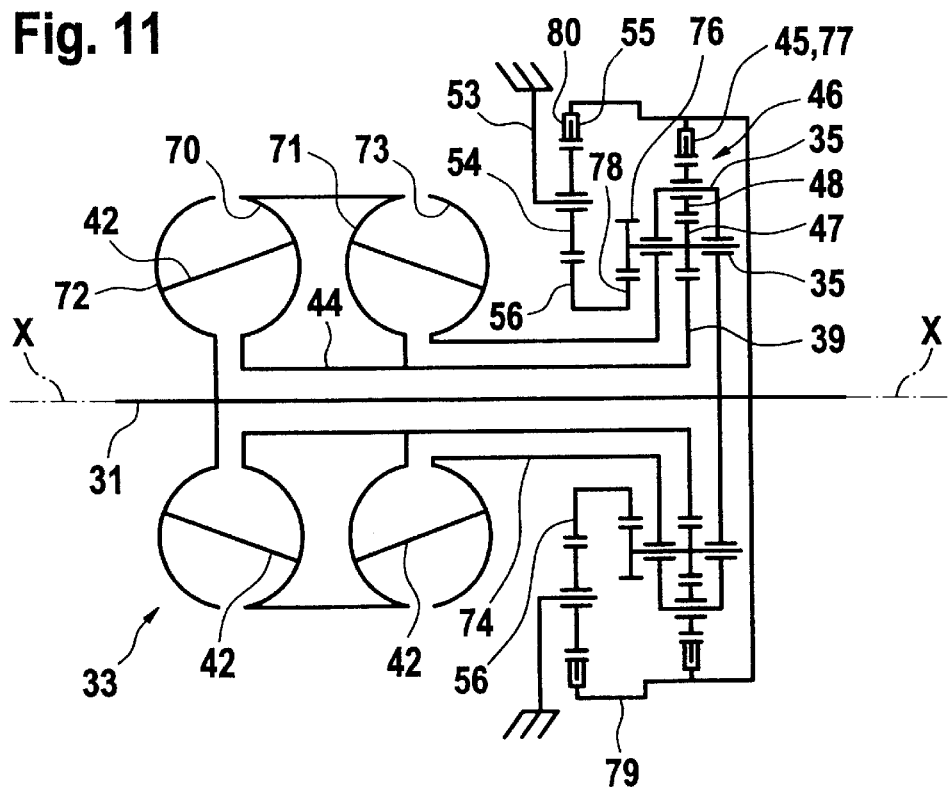
FIG. 11 is a schematic view of an alternative example according to the invention of a second embodiment of a transmission.

Unlike FIG. 10, the epicycloidal gear train 34 according to FIG. 11 does not have a second planet gear 37 and a second sun gear 40 meshing therewith and connectable to the output shaft 32. In this embodiment, the first sun gear 39 in the area inside a reversing gear train 46 lying radially outside the X—X axis is operatively connected to an internal gear 45, which can be connected to the drum 79 by a first coupling 77.

In the following, transmission embodiment with essentially the same kinetics or kinematics described above but different structural configurations are combined under one variant.

An embodiment represented in FIG. 12 (hereinafter referred to as the first variant) essentially corresponds to the development represented in FIG. 10. The planetary gear train 52 is not arranged between the epicycloidal gear train 34 and the variator 33, as in FIG. 10, but on that side of the epicycloidal gear train 34 remote from the variator 33. Drive toroidal disks 72, 73, output toroidal disks 70, 71, transmission shafts 44, 74, sun gears 39, 40, 56 and planet carriers 35, 53, and their connection and arrangement essentially correspond to the example of an embodiment represented in FIG. 10.

The further planet gear 76 is differently arranged on that side of the first planet gear 36 and of the second planet gear 37 remote from the variator and meshes with a further sun gear 78 which is torsionally fixed to the third sun gear 56.

The third sun gear 56 is an integral part of the planetary gear train 52 which furthermore has a planet gear 54 supported in relation to the planet carrier 53 fixed to the casing, and meshing with the third sun gear 56 and an internal gear 55. The internal gear can be connected by a second coupling 80 to a drum 79 torsionally fixed to the gearbox output shaft 57. The second sun gear 40 can be connected by a first coupling 77, especially by way of the drum 79, to the gearbox output shaft 57.

Figure 13:
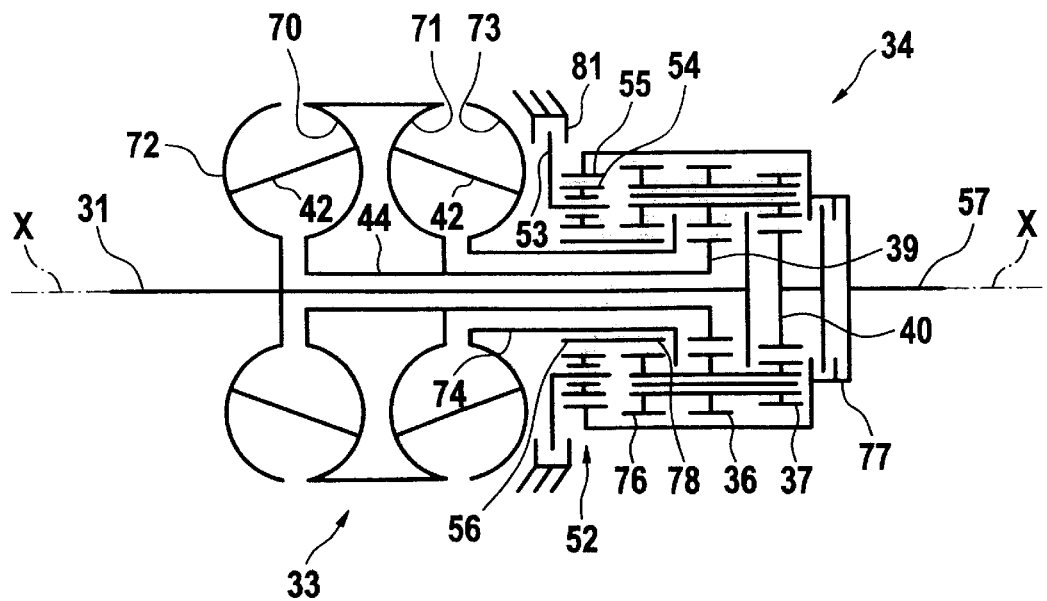
FIG. 13 is a schematic view of an alternative example according to the invention of a first embodiment of a transmission.

The embodiment according to FIG. 13 corresponds to that in FIG. 10, the internal gear 55 being fixed to the drum 79 in place of the second coupling 80 between the internal gear 55 and the drum 79. Instead of the fixed attachment of the planet carrier 53 of the planetary gear train 52 to the casing, in the embodiment according to FIG. 13, the planet carrier 53 can be connected to the casing by a brake 81.

Figure 14:
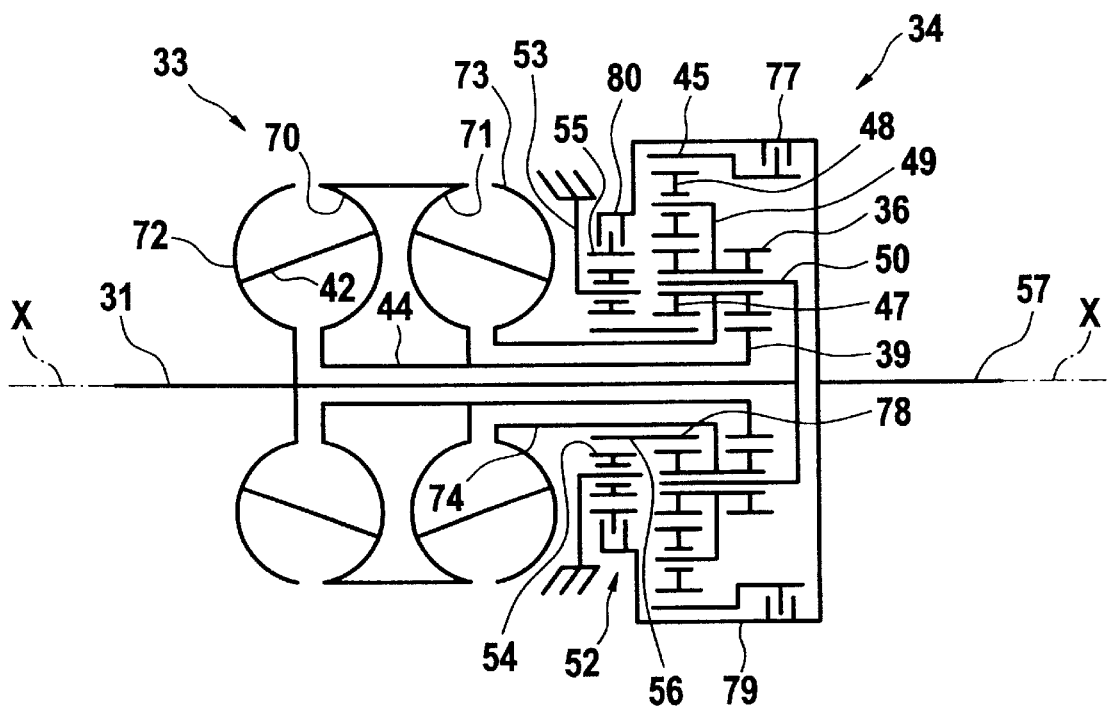
FIG. 14 is a schematic view according to the invention of the second embodiment of the transmission.

The embodiment according to FIG. 14 (hereinafter referred to as the second variant) has an epicycloidal gear train 34 similar to FIG. 3 with a further transmission stage 51 according to FIG. 5. The drive toroidal disks 72, 73, the output toroidal disks 70, 71, the transmission shafts 44, 74, the planetary gear train 52 with the planet gears 54, the third sun gear 56, the internal gear 55 and the coupling 80 between internal gear and the drum 79 connected to the output shaft are configured as in FIG. 10.

The epicycloidal gear train 34 is formed with the first sun gear 39 connected to the output toroidal disks of the first transmission shaft 44. The sun gear engages with the first planet gear 36 which is supported in relation to a planet carrier 50 rotating with the drive shaft 31. A planet gear 47, torsionally fixed to the first planet gear 36, forms part of a reversing gear train 46 together with the further sun gear 78, the planet carriers 49, 50 rotating with the drive shaft 31, and the planet gear 48.

The planet carrier 50 is torsionally fixed to the drive shaft 31, to the planet carrier 49 and to the second transmission shaft 74 connected to the second drive toroidal disk 73. The outer planet gear 48 of the reversing gear train 60 meshes with an internal gear 45, which can be connected by a coupling 77 to the drum 79.

Figure 15:
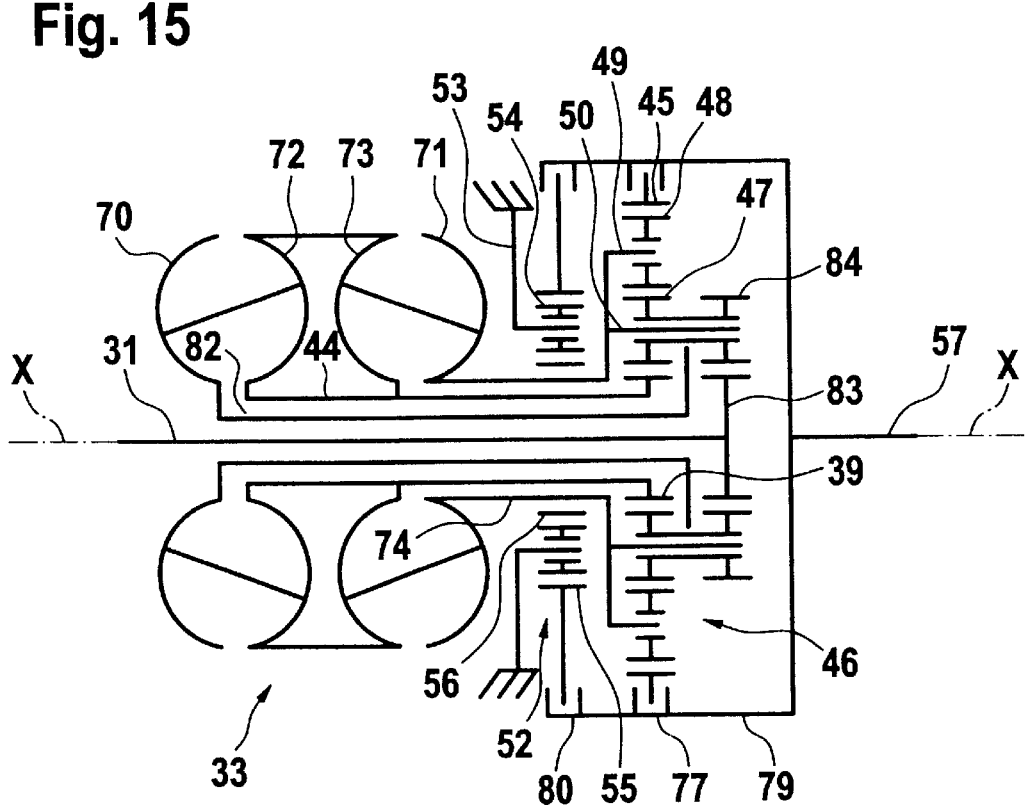
FIG. 15 is a schematic view of an alternative example according to the invention of a third embodiment transmission.

The embodiment according to FIG. 15 (hereinafter referred to as the third variant) has an epicycloidal gear train 34 (cf. FIG. 3) formed with two planet gears 47, 48 together with two planet carriers 49, 50 and an internal gear 45. The sun gear 39 of the epicycloidal gear train 34 is torsionally fixed by a first transmission shaft 44 to the two drive toroidal disks 72, 73 arranged inside the output toroidal disks 70, 71. The planet carriers 49, 50 are connected by the second transmission shaft 74 to the outside output toroidal disk 71 facing the epicycloidal gear train and by a third transmission shaft 82 to the outside output toroidal disk 70.

The drive shaft 31 is led through the two-chamber variator 33 and the first transmission shaft 44, the second transmission shaft 74 and the third transmission shaft 82, arranged coaxially with one another, and connected at the end to a sun gear 83, which meshes with a planet gear 84 torsionally fixed to the inside planet gear 47 of the reversing gear train 46.

A sun gear 56 of a planetary gear train 52 according to FIG. 5 is connected to the second transmission shaft 74. The internal gear 55 of the planetary gear train 52 can be connected by a second coupling 80 to a drum 79 fixed to the gearbox output shaft 57. The internal gear 45 assigned to the planetary gear train 46 can be connected by a first coupling 77 to the drum 79.

The embodiment represented in FIG. 16 (hereinafter referred to as the fourth variant) partially corresponds to the embodiment represented in FIG. 15. The planetary gear train with planetary gear train 46 is replaced, however, by an epicycloidal gear train 34 according to FIG. 2, in which the first sun gear 39 is connected by the first transmission shaft 44 to the inside drive toroidal disks 72, 73, and the planet carrier 35 is connected, on one hand, by the second transmission shaft 74 to the outer output toroidal disk 71 facing the epicycloidal gear train 34 and, on the other hand, by the third transmission shaft 82 to the output toroidal disk 70. A planet gear 84 torsionally fixed to the planet gears 36, 37 and rotating therewith meshes with a second sun gear 40 that can be connected to the gearbox output shaft 57 by a coupling 77.

In the embodiments represented in FIGS. 10 to 16 the epicycloidal gear train 34 and the further transmission stage 51 are arranged on one side of the variator 33, namely that side facing the transmission output. According to FIGS. 17 to 20, the epicycloidal gear train 34 may also be arranged between the chambers 85, 86 of the two-chamber variator 33, and a planetary gear train 52 with couplings 77, 80 forming the further transmission stage 51 can be arranged on that side of the variator 33 facing the transmission output.

According to FIGS. 21 to 24, the epicycloidal gear train 34 can also be arranged on that side of the two-chamber variator 33 facing the drive, and a planetary gear train 52 with couplings 77, 80 forming the further transmission stage 51 can be arranged on that side of the variator facing the transmission output.

Figure 16:
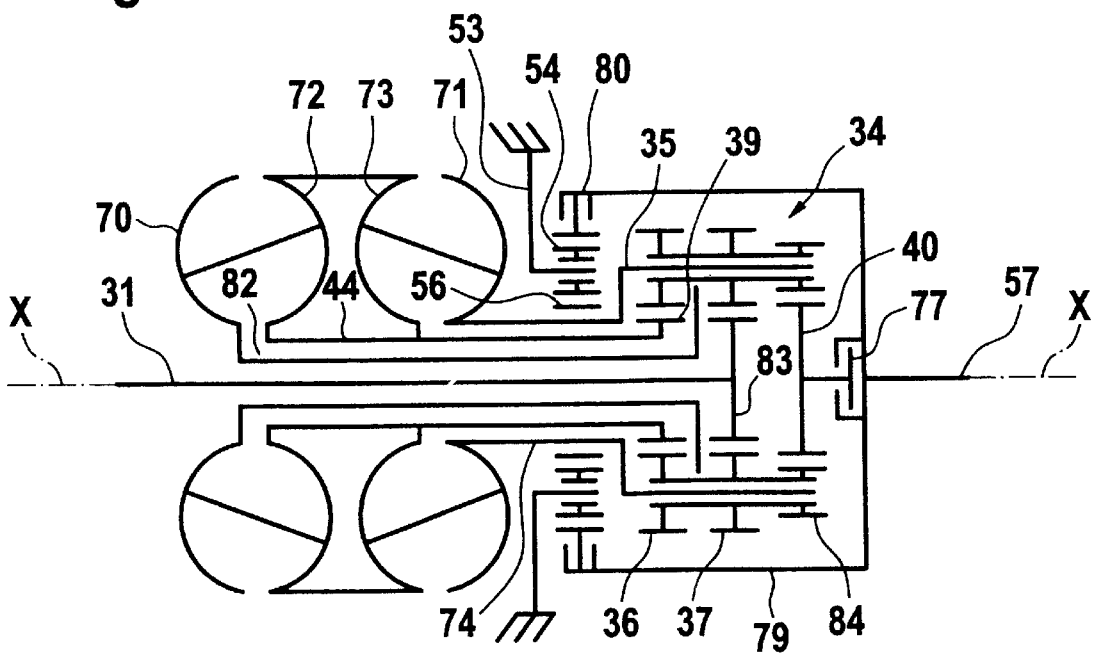
FIG. 16 is a schematic view of an alternative example according to the invention of the third embodiment of the transmission.
Figure 17:
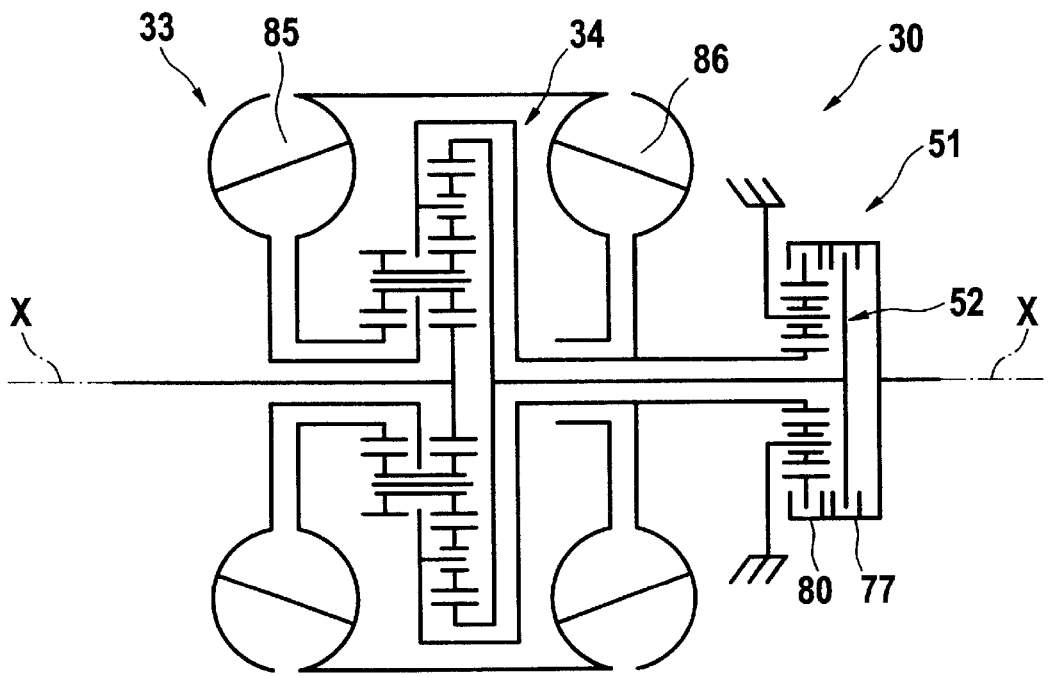
FIG. 17 is a schematic view of an alternative example according to the invention of a fourth embodiment of a transmission.
Figure 18:
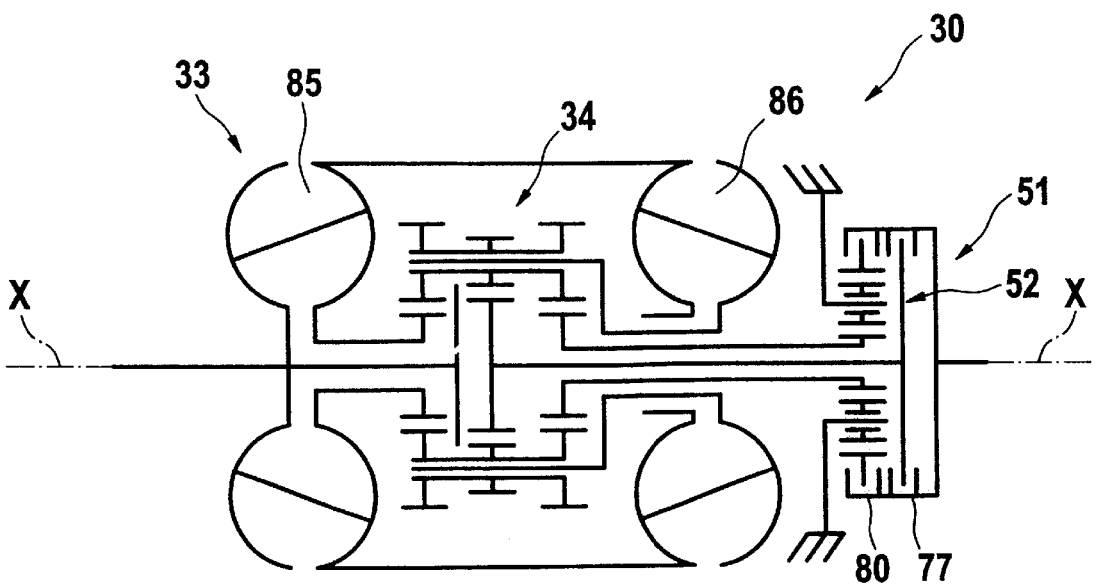
FIG. 18 is a schematic view of an alternative example according to the invention of the third embodiment of a transmission.
Figure 19:
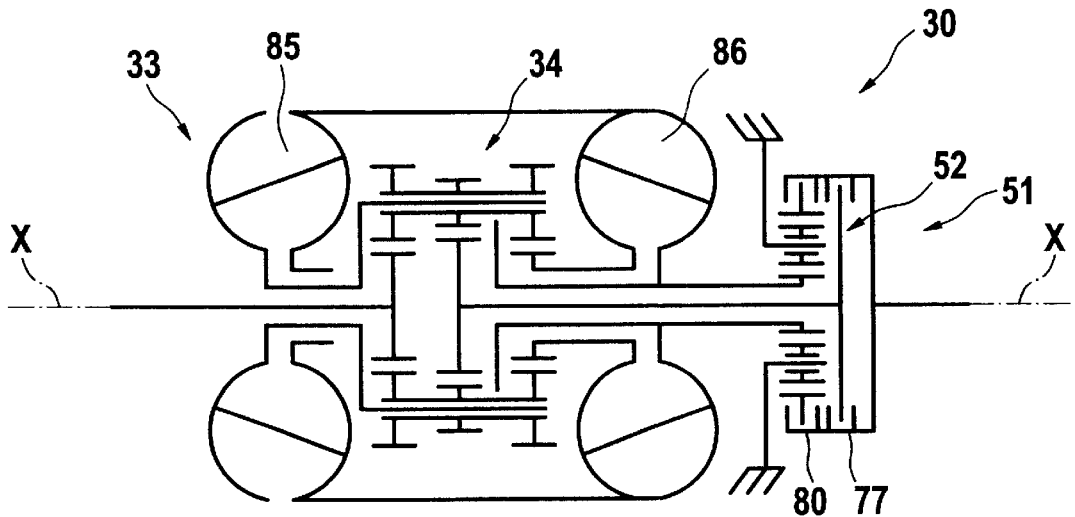
FIG. 19 is a schematic view of an alternative example according to the invention of the first embodiment of the transmission.
Figure 20:
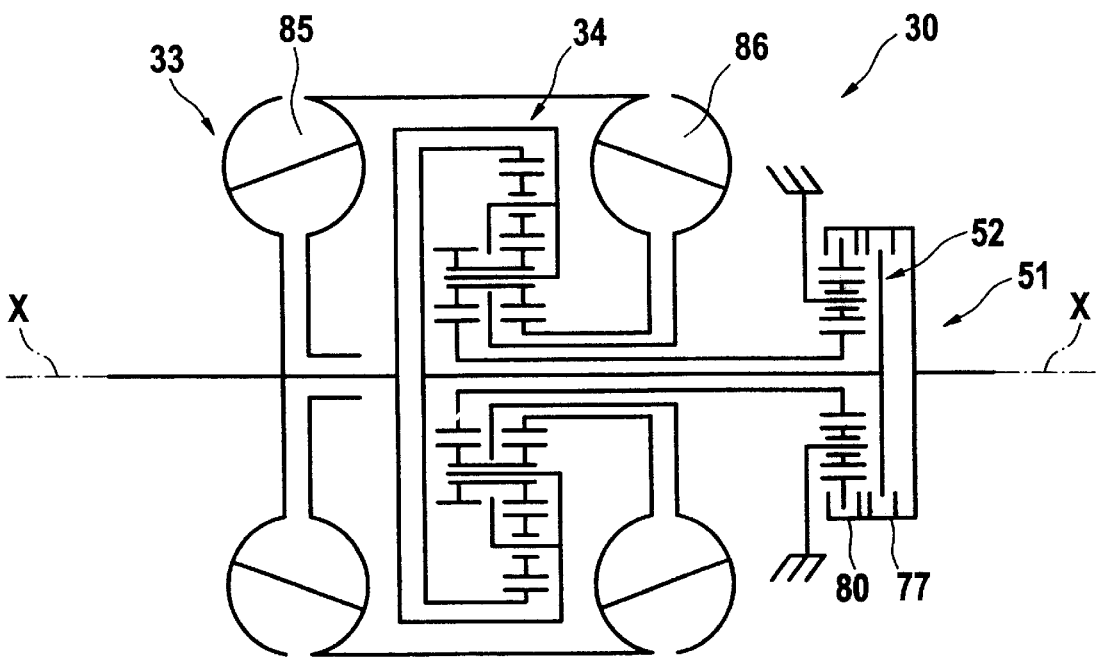
FIG. 20 is a schematic view of an alternative example according to the invention of the second embodiment of the transmission.
Figure 21:
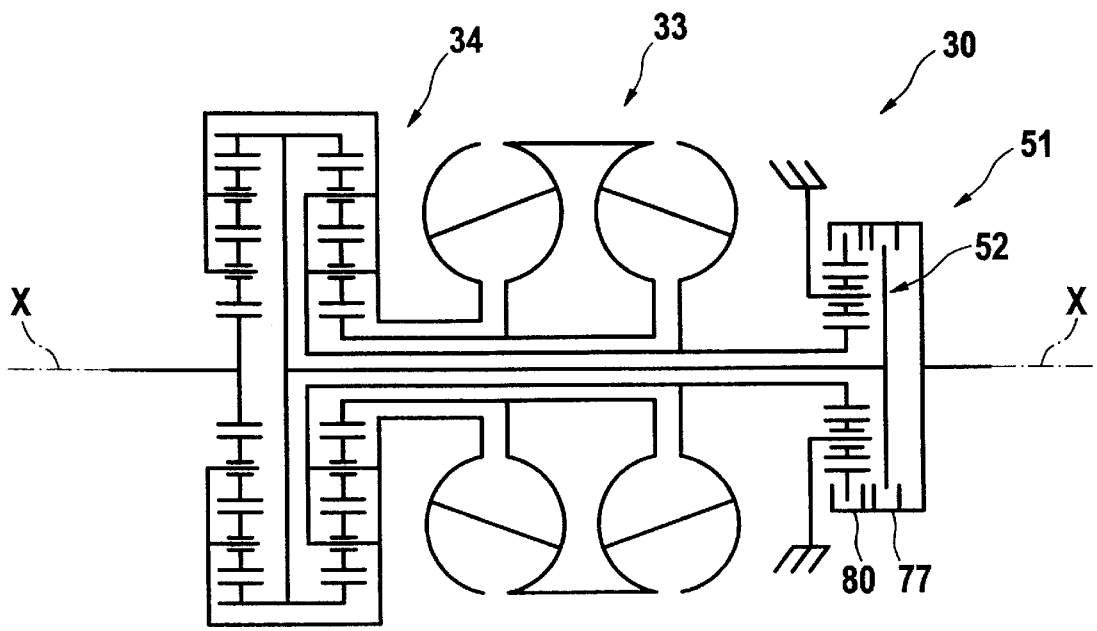
FIG. 21 is a schematic view of an alternative example according to the invention of the second embodiment of the transmission.
Figure 22:
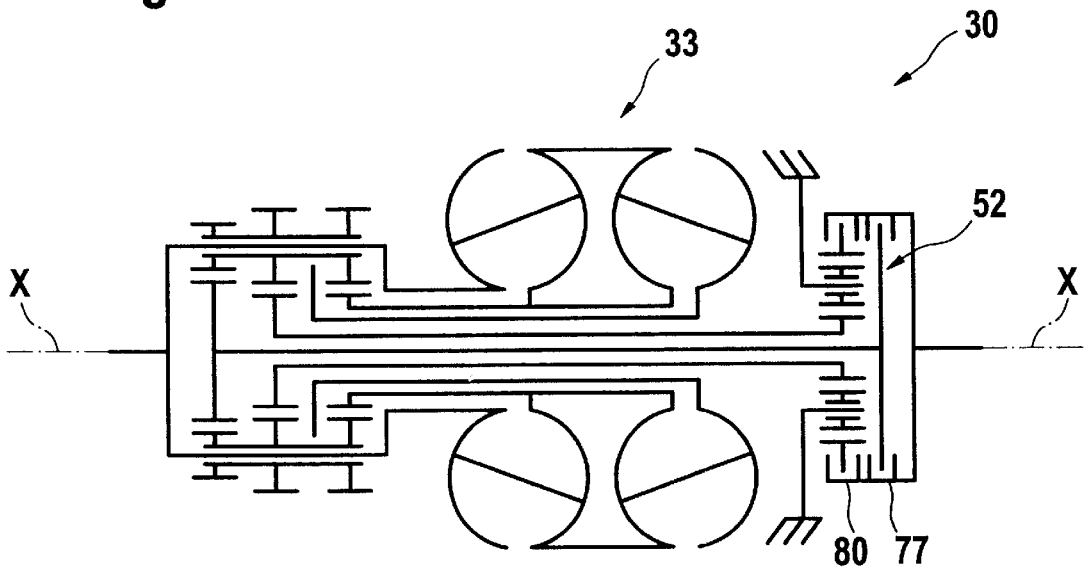
FIG. 22 is a schematic view of an alternative example according to the invention of the third embodiment of the transmission.
Figure 23:
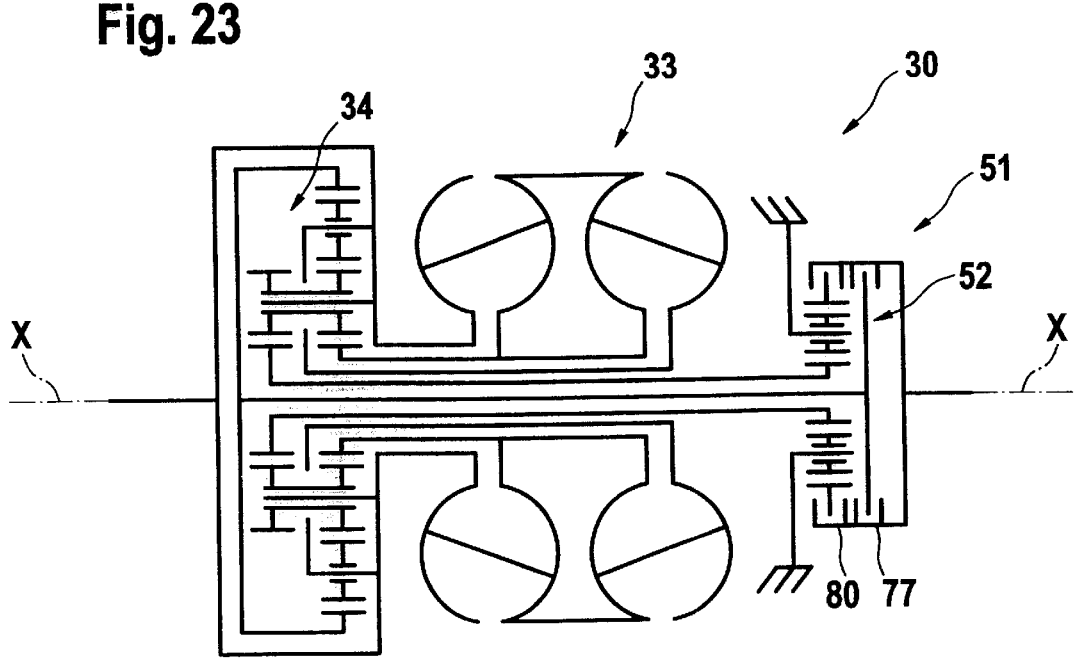
FIG. 23 is a schematic view of an alternative example according to the invention of the first embodiment of the transmission.
Figure 24:
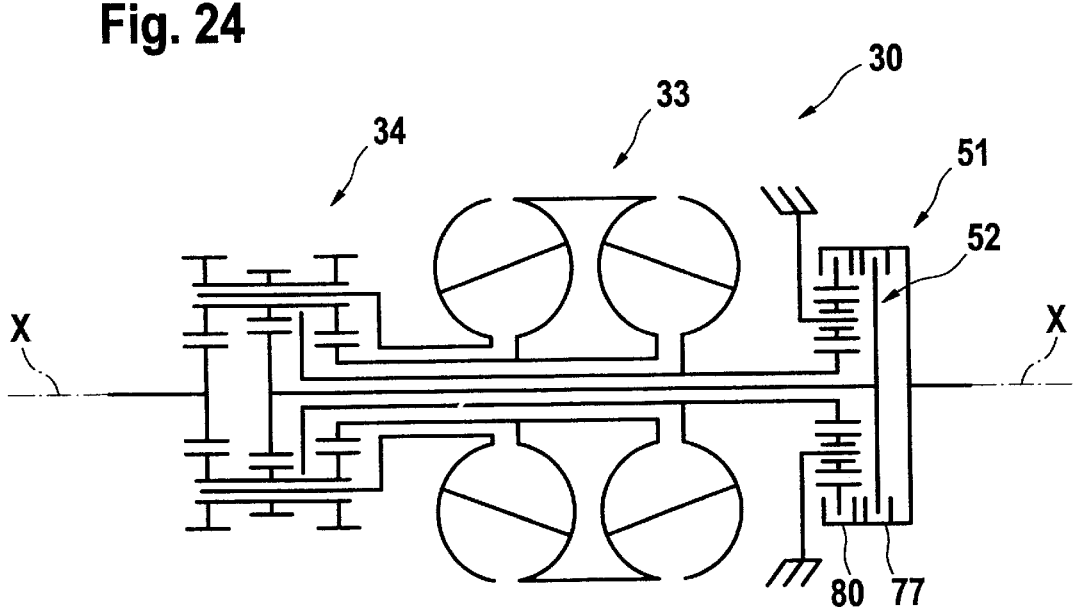
FIG. 24 is a schematic view of an alternative example according to the invention of the second embodiment of the transmission.

The examples of embodiments represented in FIGS. 18 and 22, with different spatial arrangements and the necessary connections for this, but the same mechanical and kinematic operating principle correspond to the first variant (FIG. 12 and FIG. 10) FIGS. 20 and 23 essentially correspond to the second variant (FIG. 14), FIGS. 17 and 21 correspond to the third variant (FIG. 15) and FIGS. 19 and 24 correspond to the fourth variant (FIG. 16).

Figure 12:
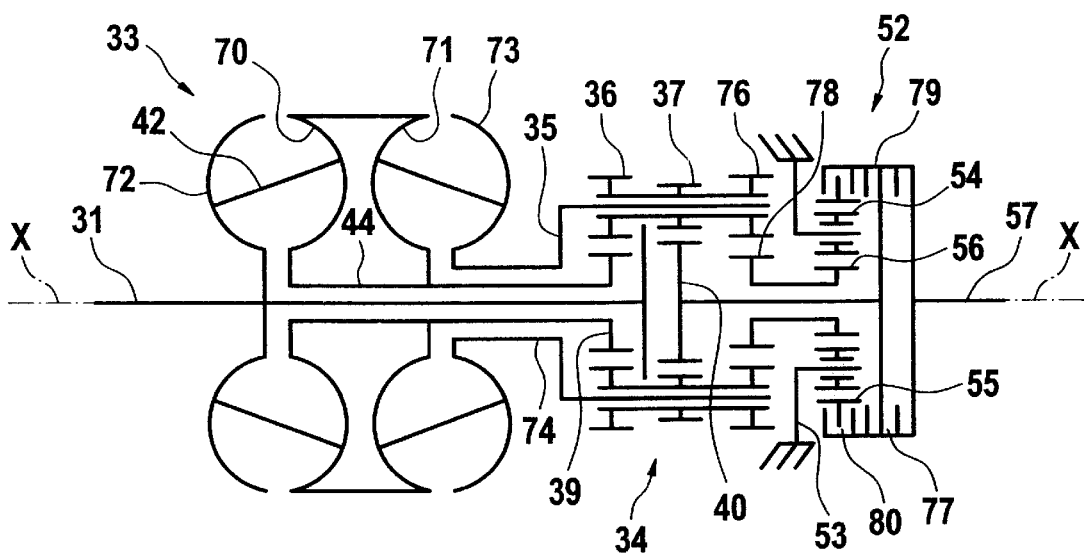
FIG. 12 is a schematic view of an example according to the invention of the first embodiment of a transmission.
Figure 25:
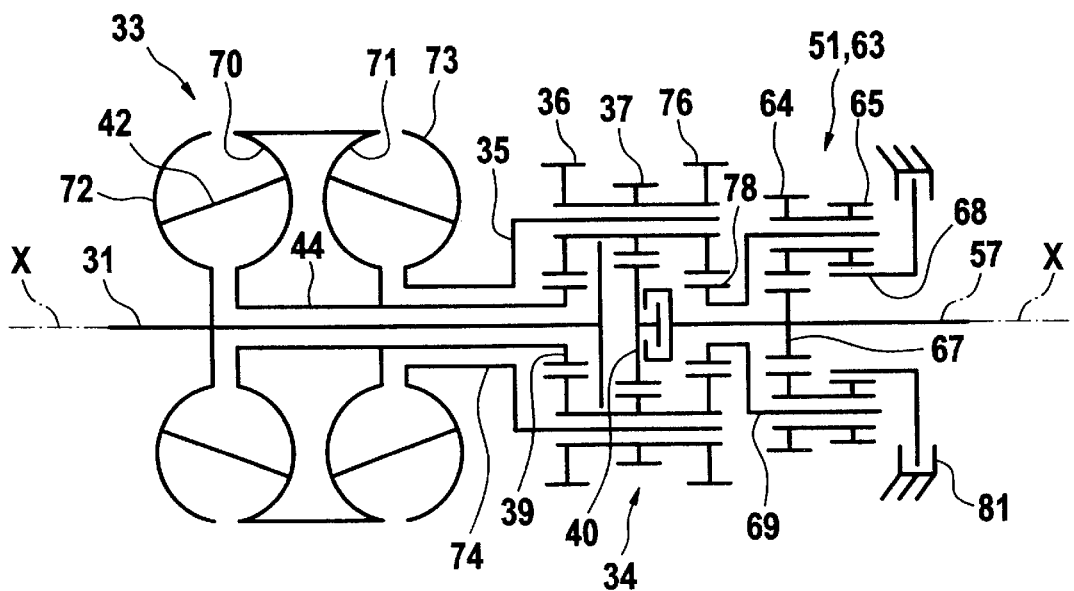
FIG. 25 is a schematic view of an alternative example according to the invention of the fourth embodiment of the transmission.

In an example of an embodiment represented in FIG. 25 the epicycloidal gear train 34 connected to the drive and output toroidal disks 70 to 73 is configured as in FIG. 12. The second sun gear 40 can be connected by a coupling 77 to the gearbox output shaft 57. The further sun gear 78 is connected to the planet carrier 69 of the further transmission stage 51 which is configured as in FIG. 8. The torsionally fixed planet gears 64, 65 are pivoted in relation to the planet carrier 69 and mesh with the third sun gear 67 assigned to the gearbox output shaft and with the fourth sun gear 68 which can be connected to the casing by a brake 81.

Figure 26:
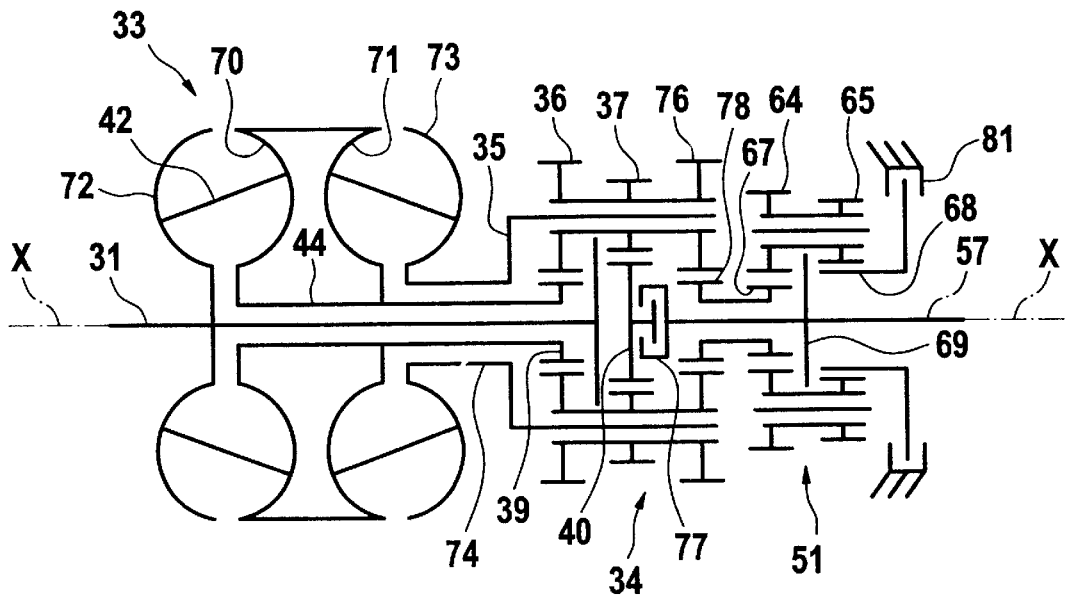
FIG. 26 is a schematic view of an alternative example of a transmission according to the invention.

In the embodiment represented in FIG. 26 the epicycloidal gear train 34 connected to the drive and output toroidal disks 70 to 73 is configured as in FIG. 12 and the further transmission stage 51 according to FIG. 9. The second sun gear 40 can be connected by a coupling 77 to the gearbox output shaft 57. The further sun gear 78 is torsionally fixed to the third sun gear 67 and meshes with the third planet gear 64 which is torsionally fixed to the fourth planet gear 65 and with the latter rotates about the planet carrier 69. The fourth sun gear 68 meshing with the fourth planet gear 65 can be connected by a brake 81 to the casing. The planet carrier 69 of the further transmission stage 51 is torsionally fixed to the gearbox output shaft.

Figure 27:
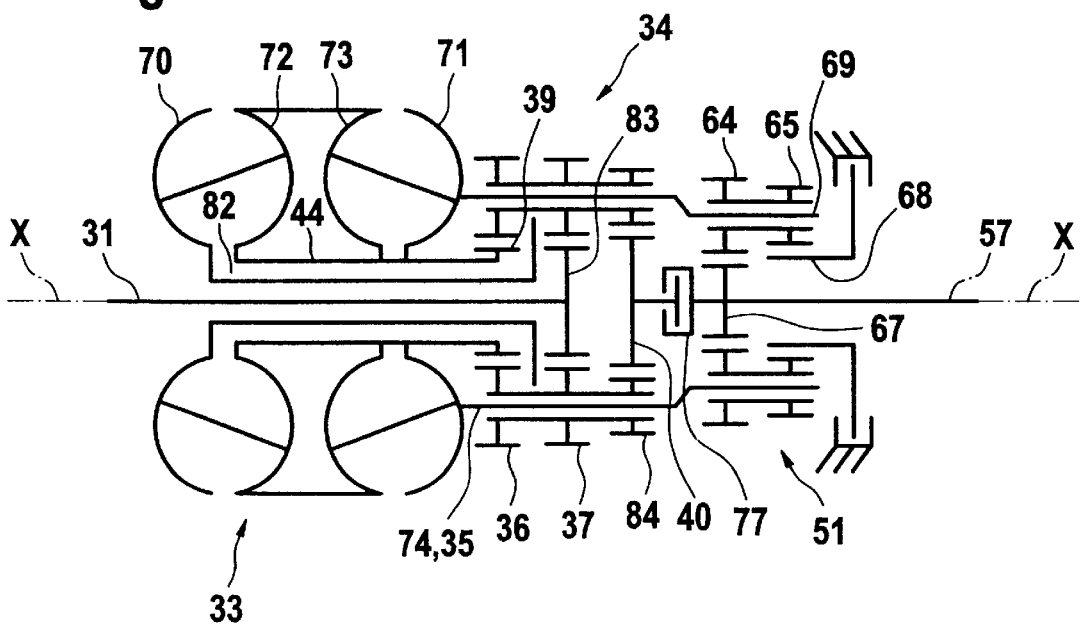
FIG. 27 is a schematic view of an alternative example of a transmission according to the invention.

In the embodiment represented in FIG. 27 the epicycloidal gear train 34 connected to the drive and output toroidal disks 70 to 73 is configured as in FIG. 16 and the further transmission stage 51 according to FIG. 8. The second sun gear 40 can be connected to the gearbox output shaft 57 by a coupling 77. The planet carrier 35 of the epicycloidal gear train 34 is torsionally fixed to the planet carrier 69 of the further transmission stage 51. The planet gears 64, 65 pivoted about the planet carrier 69 are torsionally fixed to one another. The planet gear 64 meshes with a third sun gear 67 connected to the gearbox output shaft 57, the planet gear 65 meshes with the fourth sun gear 68 which can be connected to casing by a brake 81.

Figure 28:
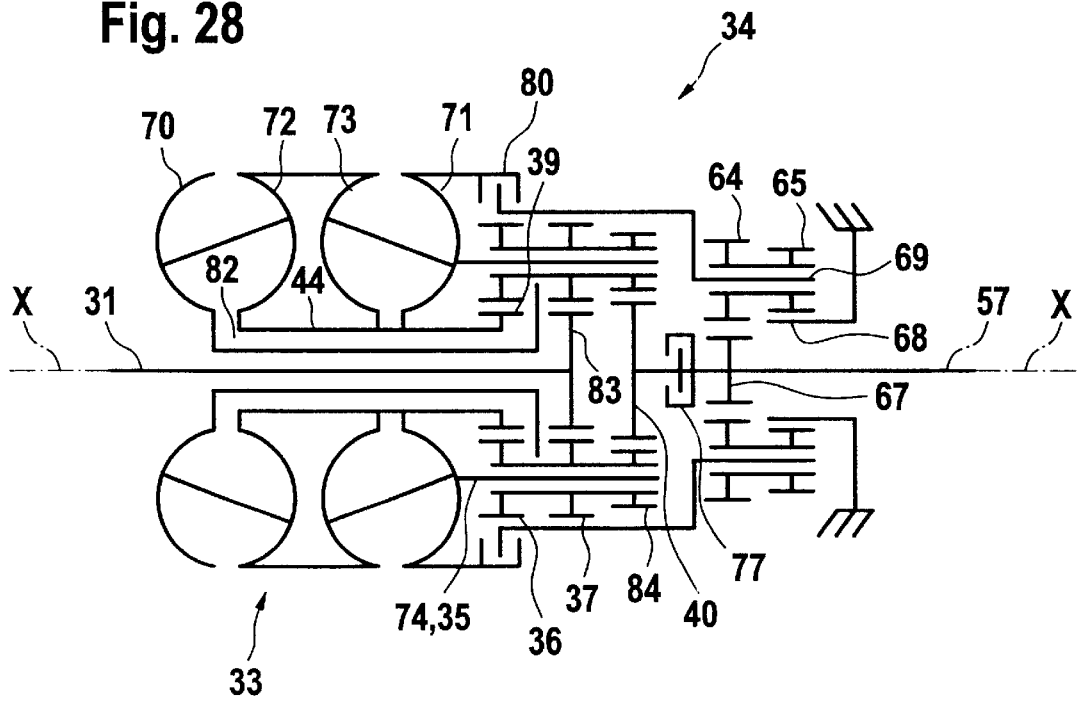
FIG. 28 is a schematic view of an alternative example of a transmission according to the invention.

Departing from the embodiment in FIG. 27, the fourth sun 68 is, according to FIG. 28, fixed to the casing, while the planet carrier 69 is connected to the output toroidal disks 70, 71 by the second coupling 80 which may be assigned, for example, to the output toroidal disk 71 or to the planet carrier 35.

In order to achieve two drive ranges, in a first drive range the first coupling 77 is closed and the second coupling 80 is opened. In a second drive range the first coupling 77 is opened and the second coupling 80 is closed. Brakes may also be used as an alternative to the said couplings.

All the connections may be torsionally fixed or detachable connections. The transmission shafts 44, 74 and 82 are hollow shafts which are arranged one inside another coaxially with the X—X axis and which radially surround the drive shaft 31 and/or the (gearbox) output shaft 32, 57.

For all the embodiments represented the drive toroidal disks, the output toroidal disks, the transmission shafts, the sun gears and the drum are arranged coaxially with the X—X axis. The planet carriers rotate about the X—X axis or are fixed to the casing or can be connected to the casing. All planet gears rotate about axes formed by the planet carriers and aligned parallel to the X—X axis. The transmission concepts represented do not have any countershaft.

The embodiments described are only examples of developments. It is also possible to combine the features described for different embodiments. Furthermore, those features in particular of parts of devices or concepts pertaining to the invention that are not described are to be inferred from the geometries of parts of devices that are represented in the drawings or from the transmission concepts represented. The transmission ratios may be designed according to the transmission ratios defined by the diameters and intervals represented or may differ from these.

While retaining the transmission concepts represented, individual elements or groups of elements may be arranged on the output side in place of the input-side arrangement represented, arranged on the input side in place of the output-side arrangement represented and/or arranged between the chambers of the variator without essentially altering the kinematics of the transmission.

The individual transmission assemblies, in particular the planetary gear trains, are preferably to be configured in such that, in proximity to the adjustment range limit of the variator (in under-drive, for example) the gearbox output shaft has the same speed in both drive ranges. This facilitates a change of drive range at approximately synchronous speed and a gear ratio change with no interruption of tractive force, thereby giving the driver a very comfortable gear shift. Furthermore, very rapid shift sequences are achievable. The shift elements do little, if any, friction work, e.g., for synchronisation, to increase the service life or to result in a small to negligible cooling oil requirement.

Some or all transmission shafts are arranged coaxially with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission for a motor vehicle, comprising:
a drive shaft, an output shaft arranged coaxially with the drive shaft with a continuously adjustable variator which has two drive toroidal disks rotating together and two output toroidal disks rotating together, and a drivetrain with an epicycloidal gear train having at least two gears, one being at least one first sun gear and another being at least one planet gear supported by at least one planet carrier, the drive toroidal disks or the output toroidal disks being torsionally fixed or connectable to the first sun gear of the epicycloidal gear train, and the disks that are unconnected to the first sun gear being torsionally fixed or connected by the at least one planet carrier of the epicycloidal gear train, wherein a second of the at least one planet gear moved by or with a first of the at least one planet gear has a diameter such that for a transmission ratio of the variator at an operating point thereof the contact point of the second planet gear with an output element of the epicycloidal gear train corresponds to the instantaneous center of the second planet gear.

2. The transmission according to claim 1, wherein the second planet gear is further supported by the at least one planet carrier.

3. The transmission according to claim 1, wherein the output toroidal disks or drive toroidal disks connected to one another by the planet carrier are arranged outside the drivetrain.

4. The transmission according to claim 1, wherein the drive toroidal disks or the output toroidal disks are connected to one another by at least one of the planet carrier and at least one transmission shaft coaxial with the drive shaft and enclosing the drive shaft and to the output shaft.

5. The transmission according to claim 1, wherein the drive toroidal disks or the output toroidal disks are torsionally fixed to one another by the drive shaft and the at least one planet carrier.

6. The transmission according to claim 5, wherein the drive toroidal disks or the output toroidal disks are torsionally fixed to one another by a first transmission shaft.

7. The transmission according to claim 1, wherein the drive toroidal disks or the output toroidal disks are torsionally fixed to one another by a transmission shaft and the at least one planet carrier.

8. The transmission according to claim 7, wherein the outer drive toroidal disks or the output toroidal disks are torsionally fixed to one another by another transmission shaft.

9. The transmission according to claim 1, wherein the at least one first sun gear is drive connected by at least one of the first planet gear and the second planet gear, connected to or engaging with the first planet gear, to an output element comprised of an internal gear or a second sun gear.

10. The transmission according to claim 1, wherein the output element is one of directly connected and connectable to the output shaft.

11. The transmission according to claim 1, wherein the output toroidal disks are arranged between the drive toroidal disks.

12. The transmission according to claim 1, wherein the drive toroidal disks are arranged to rotate with the drive shaft.

13. The transmission according to claim 1, wherein a first transmission shaft of at least one transmission shaft is arranged to rotate with the drive toroidal disks or the output toroidal disks and to transmit a torque between the two drive toroidal disks or the two output toroidal disks.

14. The transmission according to claim 13, wherein the first transmission shaft is torsionally fixed to the first sun gear.

15. The transmission according to claim 4, wherein each of the at least one transmission shaft is arranged coaxially with a rotation axis (X—X) of the drive shaft.

16. The transmission according to claim 1, wherein the planet gear operatively associated with the first sun gear is torsionally fixed to the second planet gear, and the second planet gear is operatively connected to a gear that is operatively connectable to the output shaft.

17. The transmission according to claim 1, wherein movement of the first planet gear is influencable solely by forces excited by the first sun gear, the at least one planet carrier and at least one further planet gear connected to the first planet gear.

18. The transmission according to claim 1, wherein rotational movement of at least one of the first planet gear, the output shaft, the planet carrier and a transmission shaft is transmitted to a gearbox output shaft by at least one further transmission stage.

19. The transmission according to claim 18, wherein the further transmission stage is a direct transmission stage.

20. The transmission according to claim 18, wherein with the at least one further transmission stage, transmission of rotational movement of the first planet gear or of transmission parts operatively connected to the first planet gear for torque transmission is controllable by at least one of couplings and brakes.

21. The transmission according to claim 18, wherein the further transmission stage includes a planetary gear train.

22. The transmission according to claim 21, wherein a casing is provided to which the planetary gear train comprising a planet carrier is fixable.

23. The transmission according to claim 21, wherein the output shaft or a second sun gear is torsionally fixable to a sun gear of the planetary gear train, and an internal gear of the planetary gear train is torsionally fixable to a the gearbox output shaft.

24. The transmission according to claim 21, wherein, in a drive range without torque splitting, output speed of the variator is transmitted in the planetary gear train on the output side thereof.

25. The transmission according to claim 23, wherein the output shaft or the second sun gear is torsionally fixable to the internal gear of the planetary gear train and the a third sun gear is torsionally fixable to a gearbox output shaft.

26. The transmission according to claim 21, wherein the planetary gear train is a reversing gear train.

27. The transmission according to claim 23, wherein a casing is provided to which the internal gear of the planetary gear train is fixed, planet carriers of a reversing gear train being connectable to a gearbox output shaft, and the sun gear of the planetary gear train is connectable to one of the output shaft and the second sun gear.

28. The transmission according to claim 21, wherein a casing is provided to which an internal gear of the planetary gear train comprising the further transmission stage is fixable, planet carriers of a reversing gear train being connectable to one of the output shaft and a second sun gear, and a sun gear of the planetary gear train is connectable to the gearbox output shaft.

29. The transmission according to claim 18, wherein the further transmission stage comprises an epycycloidal gear train with a stepped planet gear, a casing, a sun gear fixed to the casing and a sun gear connected to one of the output shaft and the gearbox output shaft.

* * * * *